United States Patent
Golestani et al.

(10) Patent No.: US 7,522,566 B2
(45) Date of Patent: Apr. 21, 2009

(54) COMPUTING OPTIMAL CHANNEL ALLOCATIONS USING DECOMPOSITION METHODS AND RELATED DEVICES

(75) Inventors: S. Jamaloddin Golestani, New Providence, NJ (US); Rajeev Rastogi, Chatham, NJ (US); Mark Anthony Smith, Jersey City, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 818 days.

(21) Appl. No.: 10/953,355

(22) Filed: Sep. 30, 2004

(65) Prior Publication Data

US 2006/0067258 A1    Mar. 30, 2006

(51) Int. Cl.
*H04Q 7/24*    (2006.01)
(52) U.S. Cl. .................. 370/338; 455/422; 455/446; 370/335; 370/336
(58) Field of Classification Search .................. 370/338, 370/329–337, 347, 310, 328; 455/450, 446–449, 455/422, 403, 442
See application file for complete search history.

(56) References Cited

U.S. PATENT DOCUMENTS

| | | | | |
|---|---|---|---|---|
| 5,778,317 A * | 7/1998 | Kaminsky | ................... | 455/450 |
| 6,094,584 A | 7/2000 | Khanna et al. | ............... | 455/512 |
| 6,414,949 B1 * | 7/2002 | Boulanger et al. | .......... | 370/335 |
| 6,505,045 B1 * | 1/2003 | Hills et al. | ................... | 455/449 |
| 6,636,737 B1 * | 10/2003 | Hills et al. | ................... | 455/450 |
| 6,711,148 B1 * | 3/2004 | Hills | .......................... | 370/338 |
| 2005/0190731 A1 * | 9/2005 | Bejerano et al. | ............ | 370/338 |

FOREIGN PATENT DOCUMENTS

| EP | 0 946 073 | 9/1999 |
|---|---|---|
| WO | WO 01/78326 | 10/2001 |
| WO | WO 03/094479 | 10/2001 |

OTHER PUBLICATIONS

Ali S Z: "A systematic methodology for channel assignment in mobile radio networks" Mar. 17, 2002, Wireless Communications and Networking Conference, 2002. WCNC2002. 2002 IEEE, Piscataway, NJ, USA, IEEE, pp. 692-698, XP010585679 ISBN: 0-7803-7376-6.
Giortzis A I et al: "Decomposition technique for fixed channel assignment problems in mobile radio networks" Jun. 16, 2000, IEEE Proceedings: Communications, Institution of Electrical Engineers, GB, pp. 187-194, XP006013972 ISSN: 1350-2425.
European Search Report dated Jan. 25, 2006, issued in EP 05255914.3.

\* cited by examiner

*Primary Examiner*—Edan Orgad
*Assistant Examiner*—Chuong T Ho

(57) ABSTRACT

By decomposing (i.e., dividing) an interference graph into subgraphs, it becomes feasible to compute close approximations of an optimal channel allocation scheme within a reasonable amount of time. The channel allocation scheme may be used to allocate specific channels to access points (APs) in a wireless, local area network (WLAN).

32 Claims, 3 Drawing Sheets

COMPUTING OPTIMAL CHANNEL ALLOCATIONS USING DECOMPOSITION METHODS AND RELATED DEVICES

BACKGROUND OF THE INVENTION

U.S. patent application Ser. No. 10/953,356, incorporated herein as if set forth in full herein, discloses a frame-based architecture for allocating channels to access points (APs) in a wireless, local area network (WLAN) when there are a limited number of available channels, taken into account the interference pattern between APs.

Practically speaking, except for very small WLANs (i.e. those with only a few APs) the solutions presented in U.S. patent application Ser. No. 10/953,356 may require a long period of time to compute the actual channel allocations.

U.S. patent application Ser. No. 10/953,356, filed concurrently with the present application, discloses one solution to this computation time period problem by approximating optimal channel allocations for WLANs using a so-called Greedy Heuristic technique.

While this technique is effective, it is believed that other techniques can also be used to approximate optimal channel allocations within a reasonable time period.

Further, it is believed that these other techniques may compute closer approximations to optimal channel allocations.

It is, therefore, desirable to provide alternative techniques to compute closer approximations of optimal channel allocations for WLANs within a reasonable time period.

SUMMARY OF THE INVENTION

We have recognized that an approximation of optimal channel allocations may be generated for one or more APs in a WLAN within a reasonable time period by dividing (sometimes referred to as "decomposing") an interference graph into a plurality of subgraphs and then computing, for each subgraph, a maximized sum of weights associated with active APs within each subgraph. A total sum is then computed by adding each of the maximized sums together. This total sum represents an approximation of an optimal channel allocation scheme for the entire interference graph.

Once a total sum is computed for an entire interference graph, the original interference graph is once again divided into new subgraphs by shifting so-called interference strips which divide and separate the subgraphs. The width of each interference strip represents a maximum interference distance beyond which an AP is assumed not to interfere with another AP.

Similar to the discussion above, once new subgraphs are created, a maximized sum is computed for each new subgraph and the sums are again added to generate a new total sum. This process continues until it is no longer possible to create new subgraphs by shifting interference strips, at which time the present invention then selects the highest total sum from among all of the total sums. This highest total sum represents the best, approximation of an optimal channel allocation.

Because each formed subgraph represents an interference pattern of a small WLAN, it is possible to optimally allocate channels to each subgraph within a reasonable time period. It is also possible to assign channels to the entire WLAN, represented by the many subgraphs, within a reasonable time period.

DETAILED DESCRIPTION OF THE INVENTION

Figure 1:
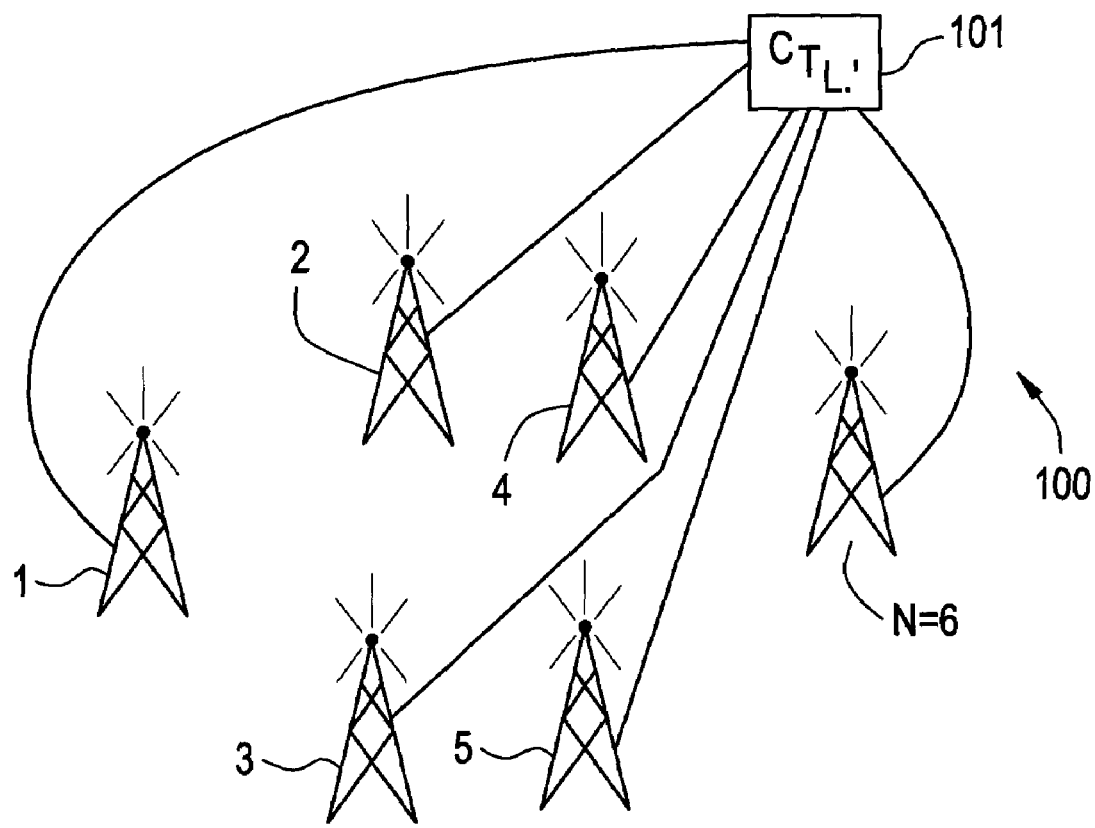
FIG. 1 depicts a simplified diagram of APs making up a WLAN.

Referring now to FIG. 1, there is shown a simplified diagram of APs 1, 2, ... N making up a WLAN 100. Also shown is a controller 101 operable to control each of the APs. In one embodiment of the present invention when the APs are base stations, the controller 101 may comprise a base station controller. The controller 101 is operable to carry out the features and functions of the present invention discussed above and below in an attempt to allocate a channel to each AP 1,2, ... N within a reasonable time period using approximations of an optimal channel allocation scheme.

Before discussing details of the present invention, it should be understood that the present invention adopts the frame-based channel allocation architecture disclosed in U.S. application Ser. No. 10/953,356 referred to above. In this architecture, only those APs that are allocated a channel during a time frame, t, are allowed to transmit. Those APs that are not allocated a channel are not permitted to transmit during time frame t.

Given this architecture, the present inventors discovered that the channel allocation problem could be represented as:

$$c*(t) = \underset{\forall c \in C}{\operatorname{argmax}} \sum_{\forall n \in U} W_n \qquad (1)$$

where $c*(t)$ is an optimal channel allocation vector, for a time frame, t, c is an arbitrary channel allocation vector, C is a feasible set of vectors, U is the set of APs that are activated in accordance with the channel allocation vector, c, and $W_n$ represents a weight assigned to a given AP, n. It should be noted that the channel allocation vector, c, and feasible set, C, referred to in Equation (1) are defined and discussed in more detail in previously filed U.S. patent application Ser. No. 10/,953,356, referred to above.

In accordance with one embodiment of the present invention, $W_n$ may be defined as:

$$W_n \underset{def}{=} \mu_n \cdot Q_n(t) \qquad (2)$$

where $\mu_n$ is a constant transmission rate for a given AP, n, and $Q_n(t)$ is a packet queue size of AP, n, during time frame t.

Before continuing, it should be noted that the inventors have developed proofs to support Equations (1) and (2). Because one of ordinary skill in the art can understand and practice the present invention without these proofs, the proofs have been omitted. Their omission, it is hoped, also helps focus the discussion herein, making it easier to follow and comprehend.

The challenge becomes solving Equation (1) in order to provide approximations of optimal channel allocations for all active APs within a reasonable time frame, while adhering to certain restrictions imposed as a result of AP interference and the limited number of channels available for allocation.

In accordance with the present invention, the inventors next discovered that approximations of an optimal channel allocation scheme (i.e., approximations of the sum, $\Sigma W_n$, in Equation (1)) could be derived by first dividing an interference graph of the form G(V, E) into subgraphs, where G represents the interference graph, V represents the set of APs each of which is referred to as a vertex and E represents the set of edges between a pair of vertices. An edge is said to exist between a pair of vertices (APs) when it is determined that interference is created when both vertices in the pair attempt to transmit using the same channel.

Because each of the subgraphs can be viewed as small WLANs, it is possible to accurately determine optimal channel allocations (which corresponds to an optimal $\Sigma W_n$) for each subgraph in a reasonable time period. Thereafter, each of the so-determined optimal channel allocations can be used to generate an approximation of an optimal channel allocation for the original, undivided interference graph.

Figure 2:
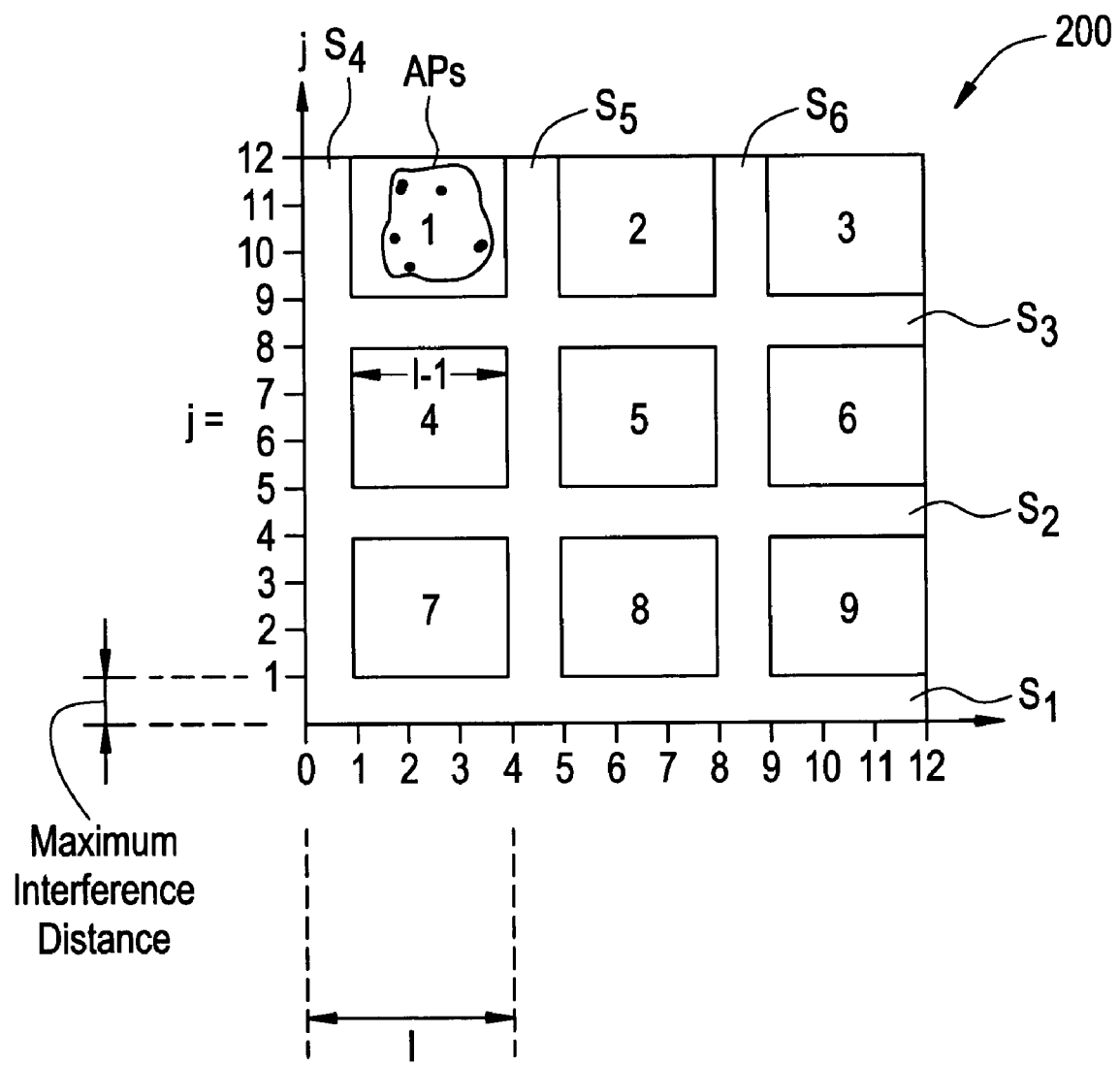
FIG. 2 depicts an interference graph divided into subgraphs according to one embodiment of the present invention.

Referring now to FIG. 2, there is shown an interference graph 200 divided into a plurality of subgraphs 1-9. As shown in FIG. 2, each of the subgraphs 1-9 is formed when the original, undivided interference graph 200 is divided (i.e., subdivided) by removing a plurality of parallel, horizontal and vertical interference strips $S_1$-$S_6$ from graph 200.

In more detail, interference graph 200 contains a plurality of APs (or vertices) representatively shown within subgraph 1. As will be recognized by one of ordinary skill in the art, if an attempt was made to determine an optimal channel allocation for graph 200 without first dividing or subdividing graph 200 into smaller subgraphs, such an attempt would, practically speaking, not be achievable because it would take too long to complete. There would be far too many APs and far too many possible channel allocation possibilities. (This assumes, of course, that the approximation techniques disclosed in U.S. patent application Ser. No. 10/953,356, filed concurrently with the present application, are not used.) By forming smaller subgraphs, such as subgraphs 1-9 in FIG. 2, it becomes possible to approximate optimal channel allocations in a reasonable time period.

Before going further, it can be said that the division of interference graph 200 into subgraphs 1-9 amounts to a "decomposition" of interference graph 200.

It also should be noted that the interference strips $S_1$-$S_6$, in effect, strip away or eliminate, from the original interference graph 200, those APs which were located in (or associated with) the same area as a strip.

In a sense, then, the number of APs making up the original interference graph 200 is reduced by the number of APs eliminated by interference strips $S_1$-$S_6$. The resulting subgraphs each contain a relatively small number of APs (having associated weights, $W_n$).

In one embodiment of the present invention, subgraphs are formed by making use of a maximum interference distance and a decomposition interval, I. By maximum interference distance is meant a distance beyond which it is assumed that APs within graph 200 do not interfere with one another. Referring to FIG. 2, the width of each of the interference strips $S_1$-$S_6$ equals the maximum interference distance associated with the APs making up interference graph 200. This distance can be normalized to unity (i.e., a unit distance equal to 1). As is depicted in FIG. 2, the decomposition interval, I, is measured from the beginning of a first interference strip to the beginning of a second interference strip (e.g., from the beginning of $S_4$ to the beginning of $S_5$). It can also be seen that the width of any given subgraph is equal to I-1 (see subgraph $S_4$). Also, the distance between any two interference strips is equal to I-1.

As will be discussed in more detail below, by selecting an appropriate decomposition interval, I, the present invention provides close approximations of optimal channel allocations for an entire interference graph.

After the subgraphs have been formed, the present invention then provides for determining an optimal channel allocation for each of the subgraphs. More specifically, in one embodiment of the present invention, the present invention first determines an optimal active or activation set, U, of APs for each of the subgraphs 1-9. More specifically, the present invention selects a first subgraph and then attempts to assign a channel to each AP within the selected subgraph according to the following rules: (a) the same channel cannot be assigned to both APs which form an edge in a subgraph (i.e., that substantially interfere with one another); (b) a sum of weights, $\Sigma W_n$, for all activated APs (i.e., for all APs that are allocated a channel) is computed that represents a maximized sum derived from all of the possible channel allocations for a subgraph; and (c) there must be a channel available to allocate to a particular AP. Another way of stating (b) is to say that the sum of weights, $\Sigma W_n$, for an activated set, U, is the maximum possible sum of weights for a particular subgraph under consideration. We will refer to this sum as the "maximized sum." This sum is associated with an optimal channel allocation for the selected subgraph.

A maximized sum is computed for each of the subgraphs, it being understood that each maximized sum represents an optimal channel allocation for each of the subgraphs. After each maximum sum has been so determined, the maximum sums are totaled to create a total sum of weights. This total sum represents an approximation of an optimal channel allocation for the entire interference graph 200.

It should be noted that this total sum does not represent an optimal channel allocation for the entire interference graph 200, even though it was based on sums associated with optimal channel allocations for each of the subgraphs. This is because, though it is possible to generate optimal channel allocations for each of the subgraphs, to generate optimal channel allocations for the entire interference graph 200 requires the inclusion of the APs that were eliminated by the interference strips $S_1$-$S_6$.

Realizing this, and desiring to generate an approximation for the entire interference graph 200 that is as close to an optimal channel allocation as possible, the present invention next provides for shifting the positions of the interference strips $S_1$-$S_6$.

In a further embodiment of the present invention, when interference strips are shifted, new subgraphs are created.

Figure 3:
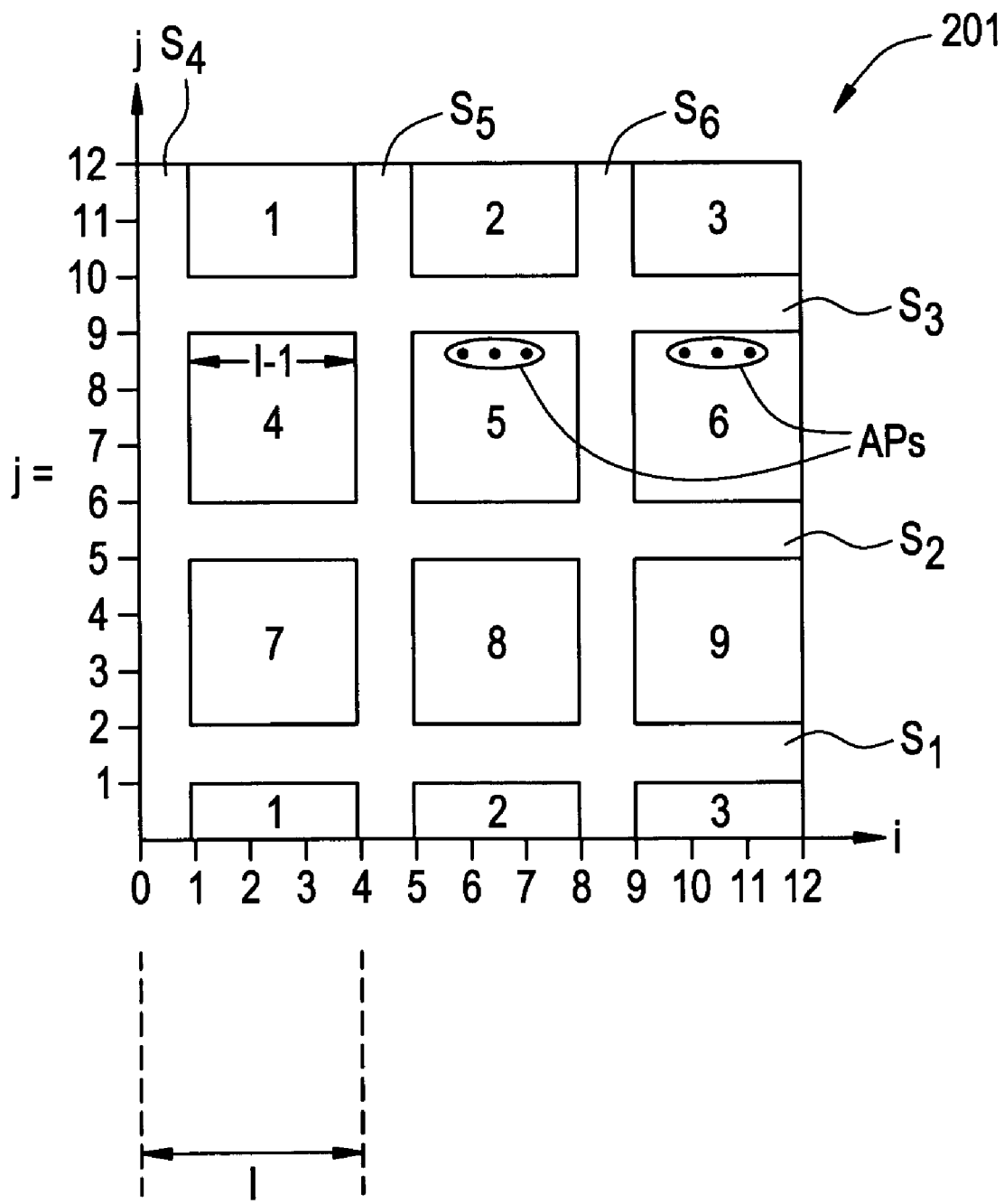
FIG. 3 depicts the interference graph of FIG. 2 divided into different subgraphs according to another embodiment of the present invention.

Referring now to FIG. 3, there is depicted the interference graph 200 after horizontal interference strips $S_1$-$S_3$ have been shifted by a distance equal to the maximum interference distance (i.e., upwards by one unit). Notice that although the interference strips have been shifted, the decomposition interval, I, and the width of each subgraph, I-1, still remain the same. It should also be noted that the number of subgraphs remains the same (the top of original subgraphs 1-3 shown in FIG. 2 in effect "roll over" to the bottom of the interference graph 200 shown in FIG. 3).

However, this shifting process causes the APs within each subgraph to change. For example, as simplistically depicted in FIG. 3, when interference strip $S_3$ is shifted from a position of j=8 in FIG. 2 to j=9 in FIG. 3, some APs which were eliminated when interference strip $S_3$ was located at position j=8 are recovered (this is indicated by the APs which are circled within subgraphs 5 and 6). Thus, it can be seen that by shifting interference strips, APs which were previously eliminated are once again added into subgraphs. More particularly, the weights associated with these APs are now included in the computation of a maximized sum of weights, and thus the channel allocation computation, for each subgraph.

Though the horizontal strips $S_1$-$S_3$ were shifted in FIG. 3, it should be understood that the vertical strips $S_4$-$S_6$ may be similarly shifted.

In accordance with a further embodiment of the present invention, once these new subgraphs have been formed, the present invention provides for once again computing a maximized sum of weights for each subgraph, this time including the weights of APs that were previously eliminated. Similar to before, after a maximized sum of weights is computed for each subgraph, the sums are totaled to arrive at a new total sum of weights for the interference graph 200 in FIG. 3. This new total sum of weights represents another approximation of the optimal channel allocation for the entire interference graph 200. It, too, however, cannot be considered an optimal channel allocation because though some APs have been added, others were eliminated along with their associated weights.

This process of shifting interference strips continues until no new subgraphs can be formed. Said another way, this shifting continues until all of the APs that have been eliminated by an earlier position of an interference strip have been recovered and used to compute a maximized sum for a particular subgraph. For example, when interference strip $S_3$ is shifted such that it begins at a position where j=12, the subgraphs formed are in fact the same as those formed when interference strip $S_3$ was positioned at j=8. After it is no longer possible to create new subgraphs by shifting interference strips, the present invention then provides for selecting the highest total sum (of weights) from among all the total sums. This selected total sum represents the best approximation of optimal channel allocations for interference graph 200. In other words, for each AP of the interference graph 200, the channel allocation used would be identical to the channel allocation used for that AP in the subgraph that corresponds to the highest total sum of weights and that contains the referenced AP.

Though the highest total sum discussed above represents a best approximation of optimal channel allocations, the present inventors sought to provide network operators and the like with some sort of guarantee that the generated approximations could be predicted to fall within a certain range of an optimal channel allocation. With this in mind, the present inventors discovered that if an interference graph representing the set of APs associated with the highest, selected total sum conforms to a "quasi-unit disk graph," then the computed approximations provide a predictable (1+∈) approximation to an optimal channel allocation.

Heretofore, existing techniques have made use of unit disk graphs not quasi-unit disk graphs. However, in considering the need to provide a guarantee to network operators and the like, the present inventors realized that if a certain interference graph representing APs conformed to a particular pattern, a pattern which differs from the unit disk graph, then a guarantee might be possible. More specifically, if the restriction: that a pair of vertices (APs) which are further apart than unity (a maximum interference distance) cannot be connected by an edge in an interference graph; is met, then the resulting approximations can be guaranteed to be within (1+∈) of an optimal channel allocation. A given interference pattern which conforms to this restriction is referred to as a quasi-unit disk graph by the inventors.

That said, there remains the challenge of determining how big each of the subgraphs should be in order to derive such approximations. This is far from being trivial, for if the size of each subgraph is too large (so that it includes too many APs or vertices), then it may not be possible to determine an optimal channel allocation scheme for an individual subgraph, let alone an approximation of an optimal channel allocation scheme for the entire interference graph 200, within a reasonable time frame.

In accordance with yet another embodiment of the present invention, the inventors discovered that if the decomposition interval, I, was selected to be O(1/∈), where ∈ represents a deviation from an optimal value and, in general, O(x) is, in a sense, a value proportional to a parameter x, (in this case x=1/∈) then the resulting approximations could be guaranteed to be within (1+∈) of an optimal channel allocation (provided the interference pattern conforms to a quasi-disk graph).

Upon comparing the approximations given in U.S. patent application Ser. No. 10/953,356, filed concurrently with the present application, with the approximations given by the present invention, the inventors realized that when their approximations could be considered to be (1+∈) approximations of optimal channel allocations, that these approximations were improved approximations over those given in U.S. patent application Ser. No. 10/953,356.

Backtracking somewhat, after a highest total sum is selected, this sum can be used to generate the best approximation of a channel allocation scheme for the interference graph 200. Even this best approximation, however, is derived from an incomplete interference graph. That is, even this best approximation does not include contributions from APs that were eliminated by interference strips associated with a divided interference graph. For example, if the total sum represented by the interference graph in FIG. 2 proves to be higher than the total sum represented by the interference graph in FIG. 3, then the present invention would select the approximated channel allocation scheme derived from the interference graph in FIG. 2. Intuitively, however, though the channel allocation scheme represented by the interference graph in FIG. 2 represents the best approximation of an optimal channel allocation scheme, the present inventors realized that this best approximation could be improved even more if they could consider the APs that were eliminated by interference strips $S_1$-$S_6$. Accordingly, in a further embodiment of the present invention, APs that were previously eliminated by interference strips are added back into an interference graph that is associated with the selected total sum, one at a time. After a previously stripped out AP is added into the graph, the present invention then attempts to allocate a channel to this added AP using the above-described techniques. If a channel can be so allocated, then the total sum of weights associated with interference graph 200 will increase. Because the total sum is related to the best approximation channel allocation, any increase in this sum will result in an improved, best approximation of an optimal channel allocation scheme. This process is repeated for each AP that was eliminated by an interference strip $S_1$-$S_6$.

To distinguish these computations and resulting approximations from those discussed earlier, they will be referred to as modified total sum computations, modified best approximations, etc.

The discussion above has set forth examples of decomposition methods and related devices for computing approximations of optimal channel allocation schemes for WLANs. It should be understood that the controller 101 shown in FIG. 1 is operable to carry out each of the steps above. Though controller 101 is shown separate from each of the APs, it may be incorporated into one or more of the APs or co-located with one or more of the APs.

It should be further understood that the true scope of the present invention is given by the claims which follow.

We claim:

1. A method for allocating one or more channels to access points (APs) during a time frame, t, within a network comprising:
   (a) assigning a weight, $W_n$, where n=1,2, ... n ,to each AP;
   (b) dividing an interference graph into a plurality of subgraphs;
   (c) computing a maximized sum of weights associated with activated APs for each subgraph;
   (d) combining each of the maximized sums to compute a first, total sum of weights for all of the subgraphs;
   (e) forming new subgraphs;
   (f) carrying out steps (c) and (d) using the new subgraphs;
   (g) combining sums associated with the new subgraphs to compute a new total sum of weights;
   (h) selecting a highest total sum of weights from the first computed total sum of weights and all of the subsequently computed, new total sum of weights, wherein the selected total sum represents a best approximation of optimal channel allocations; and
   (i) allocating one or more channels to an AP based on the selected total sum performing the steps (a)-(i) by a controller.

2. The method as in claim 1 wherein the network comprises a wireless, local area network (WLAN).

3. The method as in claim 1 further comprising dividing the interference graph using a plurality of parallel horizontal and vertical interference strips.

4. The method as in claim 3 further comprising eliminating APs from the interference graph associated with areas that are associated with the plurality of parallel horizontal and parallel vertical interference strips.

5. The method as in claim 3 wherein a width of each strip equals a maximum interference distance.

6. The method as in claim 5 wherein the maximum interference distance comprises a distance beyond which an AP does not interfere with another AP.

7. The method as in claim 3 further comprising positioning the parallel strips such that a beginning of one parallel strip is separated by a selected decomposition interval, I, from the beginning of another parallel strip.

8. The method as in claim 7 wherein a width of a subgraph equals I-1.

9. The method as in claim 1 wherein the step of forming new subgraphs comprises shifting parallel horizontal or parallel vertical interference strips a distance equal to a width of a strip to form the new subgraphs.

10. The method as in claim 7 wherein the decomposition interval is selected to be $O(1/\in)$, where $\in$ represents a deviation from an optimal value and $O(1/\in)$ represents a value proportional to $1/\in$.

11. The method as in claim 10 wherein the best approximation comprises a $(1+\in)$ approximation of the optimal channel allocation when an interference pattern of APs, associated with the selected total sum, conforms to a quasi-unit disk graph.

12. The method as in claim 1 further comprising identifying an active set of APs within each of the subgraphs.

13. The method as in claim 12 wherein each active set comprises one or more APs that can be allocated a channel from a group of available channels.

14. The method as in claim 12 further comprising allocating a channel from among the group of available channels to each AP within a subgraph, provided the same channel cannot be assigned to a pair of APs that make up an edge of an interference graph representing the subgraph.

15. The method as in claim 4 further comprising:
   selecting an interference graph associated with the selected highest total sum of weights;
   adding previously eliminated APs back to the selected interference graph;
   attempting to allocate a channel to each added AP provided the same channel cannot be assigned to a pair of APs that make up an edge; and
   adding a weight attributed to each AP that is allocated a channel to the selected total sum of weights to form a modified, total sum,
   wherein the modified total sum represents a closer approximation of the optimal channel allocations than the best approximation.

16. A device for allocating one or more channels to access points (APs) during a time frame, t, within a network operable to:
   (a) assign a weight, $W_n$, where n =1,2, ... n, to each AP;
   (b) divide an interference graph into a plurality of subgraphs;
   (c) compute a maximized sum of weights associated with activated APs for each subgraph;
   (d) combine each of the maximized sums to compute a first, total sum of weights for all of the subgraphs;
   (e) form new subgraphs;
   (f) carry out steps (c) and (d) using the new subgraphs;
   (g) combine sums associated with the new subgraphs to form a new total sum of weights;
   (h) select a highest total sum of weights from the first computed total sum of weight and all of the subsequently computed, new total sum of weights, wherein the selected total sum represents a best approximation of optimal channel allocations; and
   (i) allocating one or more channels to an AP based on the selected total sum.

17. The device as in claim 16 wherein the network comprises a wireless, local area network (WLAN).

18. The device as in claim 16 further operable to divide the interference graph using a plurality of parallel horizontal and vertical strips.

19. The device as in claim 18 further operable to eliminate APs from the interference graph associated with areas that are associated with the plurality of parallel horizontal and vertical strips.

20. The device as in claim 18 wherein a width of each strip equals a maximum interference distance.

21. The device as in claim 20 wherein the maximum interference distance comprises a distance beyond which an AP does not interfere with another AP.

22. The device as in claim 18 further operable to position the parallel strips such that a beginning of one parallel strip is separated by a selected decomposition interval, I, from the beginning of another parallel strip.

23. The device as in claim 22 wherein a width of a subgraph equals I-1.

24. The device as in claim 16 further operable to shift parallel horizontal or parallel vertical interference strips a distance equal to a width of a strip to form the new subgraphs.

25. The device as in claim 22 wherein the decomposition interval is selected to be $O(1/\in)$, where $\in$ represents a deviation from an optimal value and $O(1/\in)$ represents a value proportional to $1/\in$.

26. The device as in claim 25 wherein the best approximation comprises a $(1+\in)$ approximation of the optimal channel allocation when an interference pattern of APs associated with the selected total sum conforms to a quasi-unit disk graph.

27. The device as in claim 16 further operable to identify an active set of APs within each of the subgraphs.

28. The device as in claim 27 wherein each active set comprises one or more APs that can be allocated a channel from a group of available channels.

29. The device as in claim 27 further operable to allocate a channel from among the group of available channels to each AP within a subgraph, provided the same channel cannot be assigned to a pair of APs that make up an edge of an interference graph representing the subgraph.

30. The device as in claim 19 further operable to:
   select an interference graph associated with the selected highest total sum of weights;
   add previously eliminated APs back into the selected interference graph;
   attempt to allocate a channel to each added AP provided the same channel cannot be assigned to a pair of APs that make up an edge; and
   add a weight attributed to each AP that is allocated a channel to the selected total sum of weights to form a modified, total sum,
   wherein the modified total sum represents a closer approximation of the optimal channel allocations than the best approximation.

31. The device as in claim 16 wherein the device comprises a controller.

32. The device as in claim 16 wherein the device comprises a base station controller.

* * * * *